United States Patent
Matsubara (10) Patent No.: US 10,060,519 B2
(45) Date of Patent: Aug. 28, 2018

(54) POWER TRANSFER DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventor: Mitsumasa Matsubara, Nagoya (JP)

(73) Assignees: AISIN AW CO. LTD., Anjo-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 156 days.

(21) Appl. No.: 15/116,017

(22) PCT Filed: Mar. 18, 2015

(86) PCT No.: PCT/JP2015/058093
§ 371 (c)(1),
(2) Date: Aug. 2, 2016

(87) PCT Pub. No.: WO2015/146750
PCT Pub. Date: Oct. 1, 2015

(65) Prior Publication Data
US 2017/0130818 A1   May 11, 2017

(30) Foreign Application Priority Data
Mar. 27, 2014   (JP) .................................. 2014-066504

(51) Int. Cl.
| F16H 57/04  | (2010.01) |
| F16H 57/037 | (2012.01) |
| F16H 48/08  | (2006.01) |
| F16H 48/42  | (2012.01) |

(Continued)

(52) U.S. Cl.
CPC ......... *F16H 57/0424* (2013.01); *F16H 48/08* (2013.01); *F16H 48/42* (2013.01);
(Continued)

(58) Field of Classification Search
USPC ........................................................ 475/160
See application file for complete search history.

(56) References Cited

U.S. PATENT DOCUMENTS

| 5,048,370 A | * | 9/1991 | Duello | ................ F16H 57/0423 |
| | | | | 74/421 R |
| 7,984,791 B2 | * | 7/2011 | Taguchi | .............. F16H 57/0483 |
| | | | | 184/11.1 |

(Continued)

FOREIGN PATENT DOCUMENTS

| JP | 62-13261 U   | 1/1987 |
| JP | 05-180308 A  | 7/1993 |

(Continued)

OTHER PUBLICATIONS

International Search Report of PCT/JP2015/058093 dated Jun. 23, 2015.

*Primary Examiner* — Dirk Wright
(74) *Attorney, Agent, or Firm* — Sughrue Mion, PLLC (57) ABSTRACT

An extending curved portion is provided below a bearing used in a bearing that supports a counter shaft of a reservoir plate to extend so as to receive the bearing, and to swell toward a differential chamber with respect to a bearing support portion that supports the bearing. In addition, the bearing support portion is provided with drainpipe-like ribs that serve as drainpipes that lead working oil to the extending curved portion. Consequently, working oil supplied from a working oil supply hole to the bearing and flowing down from the center of rotation of the bearing can be led to a working oil storage chamber.

18 Claims, 7 Drawing Sheets

(51) Int. Cl.
*F16H 57/021* (2012.01)
*F16H 3/66* (2006.01)
*F16H 37/08* (2006.01)

(52) U.S. Cl.
CPC ......... *F16H 57/021* (2013.01); *F16H 57/037* (2013.01); *F16H 57/045* (2013.01); *F16H 57/0471* (2013.01); *F16H 57/0483* (2013.01); *F16H 3/663* (2013.01); *F16H 37/0813* (2013.01); *F16H 2048/423* (2013.01); *F16H 2200/006* (2013.01); *F16H 2200/0086* (2013.01); *F16H 2200/2007* (2013.01); *F16H 2200/2025* (2013.01); *F16H 2200/2046* (2013.01); *F16H 2200/2066* (2013.01); *F16H 2200/2082* (2013.01); *F16H 2200/2097* (2013.01)

(56) References Cited

U.S. PATENT DOCUMENTS

| | | | | |
|---|---|---|---|---|
| 8,366,577 B2 * | 2/2013 | Shibayama | ......... | F16H 57/0457 475/159 |
| 8,371,978 B2 * | 2/2013 | Nobata | ............... | F16H 57/0457 475/160 |
| 9,103,432 B2 * | 8/2015 | Isomura | ............... | F16H 57/0423 |
| 9,435,421 B2 * | 9/2016 | Mafune | ............... | F16H 57/0409 |
| 9,851,001 B2 * | 12/2017 | Higashi | ................ | F16H 57/027 |
| 9,890,848 B2 * | 2/2018 | Girardot | ............... | F16H 57/0483 |
| 9,903,465 B2 * | 2/2018 | Matsubara | .......... | F16H 57/0483 |

FOREIGN PATENT DOCUMENTS

| | | | | |
|---|---|---|---|---|
| JP | 2014190529 A | * | 10/2014 | ......... F16H 57/0423 |
| JP | 2015124822 A | * | 7/2015 | ......... F16H 57/0423 |
| WO | 2011/121861 A1 | | 10/2011 | |
| WO | WO-2014156730 A1 | * | 10/2014 | ......... F16H 57/0423 |
| WO | WO-2015146573 A1 | * | 10/2015 | ......... F16H 57/0457 |
| WO | WO-2015146622 A1 | * | 10/2015 | ......... F16H 57/0427 |
| WO | WO-2015146632 A1 | * | 10/2015 | ......... F16H 57/0452 |
| WO | WO-2015146633 A1 | * | 10/2015 | ......... F16H 57/0424 |
| WO | WO-2015146760 A1 | * | 10/2015 | ......... F16H 57/0424 |
| WO | WO-2015166821 A1 | * | 11/2015 | ............. F16H 57/04 |

* cited by examiner

|   |     | C-1 | C-2 | C-3 | C-4 | B-1 | B-2 | F-1 |
|---|-----|-----|-----|-----|-----|-----|-----|-----|
| D | 1st | ○ |   |   |   |   | ● | ○ |
|   | 2nd | ○ |   |   |   | ○ |   |   |
|   | 3rd | ○ |   | ○ |   |   |   |   |
|   | 4th | ○ |   |   | ○ |   |   |   |
|   | 5th | ○ | ○ |   |   |   |   |   |
|   | 6th |   | ○ |   | ○ |   |   |   |
|   | 7th |   | ○ | ○ |   |   |   |   |
|   | 8th |   | ○ |   |   | ○ |   |   |
| REV1 |   |   |   | ○ |   |   | ○ |   |
| REV2 |   |   |   |   | ○ |   | ○ |   |

※○: ENGAGED,
● : ENGAGED WITH ENGINE BRAKE IN OPERATION

POWER TRANSFER DEVICE

TECHNICAL FIELD

The present disclosure relates to a power transfer device, and in particular to a power transfer device that includes a differential ring gear disposed below a drive pinion gear on the input side and meshed with the drive pinion gear, a differential gear coupled to the differential ring gear, and a case that houses the differential ring gear and the differential gear.

BACKGROUND ART

There has hitherto been known a power transfer device that includes a counter shaft disposed in parallel with an input shaft of a speed change mechanism, a differential device (differential gear) that has a ring gear (differential ring gear) disposed below the counter shaft and meshed with an output gear of the counter shaft, a case member that houses the speed change mechanism and the differential device, and a differential partitioning member that partitions a space in the case member into a differential chamber, in which the differential device is housed, and a storage chamber, in which oil (working oil) is stored (see Patent Document 1, for example). In the power transfer device, the differential partitioning member is composed of a part of the case member, a rib member provided to extend along the outer peripheral surface of the ring gear from the case member, and a hemispherical reservoir plate disposed so as to cover the differential device from the side opposite to the case member and tightly contact the inner peripheral surface of the rib member. Consequently, in the power transfer device, an inflow of oil from the storage chamber into the differential chamber is suppressed by the differential partitioning member.

RELATED-ART DOCUMENTS

[Patent Documents]
 [Patent Document 1] International Publication WO 2011/121861

SUMMARY

In the power transfer device according to the related art, a drive pinion gear, a bearing for the drive pinion gear, the differential ring gear, and a differential reservoir plate are provided, and lubricating oil for the bearing for the drive pinion gear directly flows into the differential chamber from a space between the bearing for the drive pinion gear and the differential ring gear. Oil that resides in the differential chamber is raked up by the differential ring gear of the differential device to be used for lubrication and cooling. If the amount of oil that resides in the differential chamber is increased, however, the stirring resistance of oil which acts on the differential ring gear may be increased.

It is a main object of the power transfer device according to the present disclosure to suppress an inflow of working oil into a differential chamber in which a differential ring gear and a differential gear are disposed, and to suppress an increase in stirring resistance of working oil which acts on the differential ring gear due to a residence of working oil in the differential chamber.

In order to achieve the foregoing main object, the power transfer device according to the present disclosure adopts the following means.

The present disclosure provides
a power transfer device including: a differential ring gear disposed below a drive pinion gear on the input side and meshed with the drive pinion gear; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein:
the partitioning member forms the working oil storage chamber together with a first case member of the case, and forms the differential chamber together with a second case member of the case;
the first case member has a bearing support portion that supports a bearing that rotatably supports a rotary shaft of the drive pinion gear, and a working oil supply hole through which working oil is supplied to the bearing; and
the partitioning member has an extending curved portion positioned below the bearing on the differential ring gear side with respect to the bearing and curved so as to swell toward the differential chamber with respect to the bearing support portion in order to lead working oil flowing down from the bearing to the working oil storage chamber.

In the power transfer device according to the present disclosure, the partitioning member forms the working oil storage chamber together with the first case member of the case, and forms the differential chamber together with the second case member of the case. The first case member has the bearing support portion which supports a bearing that rotatably supports a rotary shaft of the drive pinion gear, and the working oil supply hole through which working oil is supplied to the bearing. The partitioning member has the extending curved portion which is positioned below the bearing on the differential ring gear side with respect to the bearing and curved so as to swell toward the differential chamber with respect to the bearing support portion in order to lead working oil flowing down from the bearing to the working oil storage chamber. Consequently, working oil flowing down from the bearing is led to the working oil storage chamber by the extending curved portion. Therefore, it is possible to suppress an inflow of working oil into the differential chamber in which the differential ring gear and the differential gear are disposed, and to suppress an increase in stirring resistance of working oil which acts on the differential ring gear due to a residence of working oil in the differential chamber.

DETAILED DESCRIPTION OF THE PREFERRED EMBODIMENT

Now, an embodiment of the present disclosure will be described with reference to the drawings.

Figure 1:
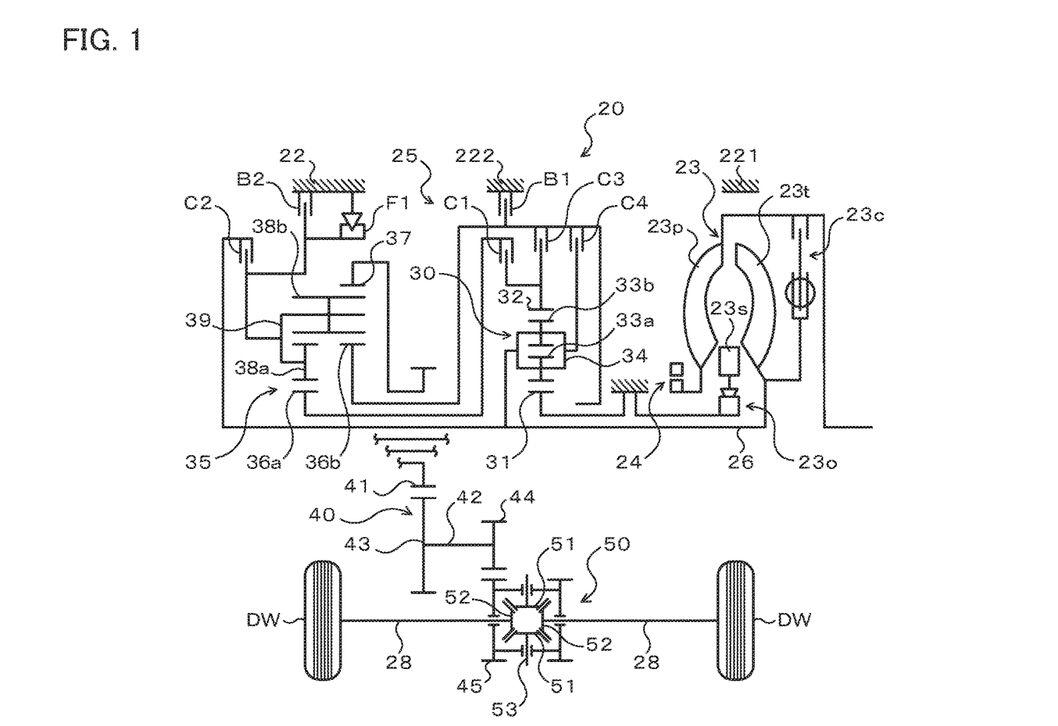
FIG. 1 is a schematic configuration diagram of a power transfer device 20 according to the present disclosure.

FIG. 1 is a schematic configuration diagram of a power transfer device 20 according to the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a converter housing 220 (first case member) and a transaxle case 240 (second case member) coupled to the converter housing 220, a fluid transmission apparatus (starting device) 23 housed in the converter housing 220, an oil pump 24, an automatic transmission 25 housed in the transaxle case 240, a gear mechanism (gear train) 40, a differential gear (differential mechanism) 50, and so forth.

The fluid transmission apparatus 23 is structured as a torque converter that includes a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts the rotational direction of the stator 23s to one direction, a lock-up clutch 23c, and so forth. It should be noted, however, that the fluid transmission apparatus 23 may be structured as a fluid coupling that does not include the stator 23s.

The oil pump 24 is structured as a gear pump that includes a pump assembly composed of a pump body and a pump cover, and an externally toothed gear connected to the pump impeller 23p of the fluid transmission apparatus 23 via a hub. The oil pump 24 is driven by power from the engine to suction working oil (ATF) stored in an oil pan (not illustrated) and pump the working oil to a hydraulic control device (not illustrated).

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is held stationary to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and mating plates, an oil chamber supplied with hydraulic oil, and so forth, and that is capable of fastening and unfastening the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and mating plates, an oil chamber supplied with working oil, and so forth, and that is capable of fastening and unfastening the planetary carrier 34 of the first planetary gear mechanism 30 and the second sun gear 36b of the second planetary gear mechanism 35 to and from each other.

The brake B1 is a hydraulic brake (friction engagement element) that is structured as a band brake or a multi-plate friction-type brake including a hydraulic servo, and that is capable of making the second sun gear 36b of the second planetary gear mechanism 35 stationary and movable with respect to the transmission case 22. The brake B2 is a hydraulic brake that is structured as a band brake or a multi-plate friction-type brake including a hydraulic servo, and that is capable of making the planetary carrier 39 of the second planetary gear mechanism 35 stationary and movable with respect to the transmission case 22. In addition, the one-way clutch F1 includes an inner race, an outer race, a plurality of sprags, and so forth, for example. The one-way clutch F1 transfers torque via the sprags when the outer race rotates in one direction with respect to the inner race, and allows the inner race and the outer race to rotate with respect to each other when the outer race rotates in the other direction with respect to the inner race. It should be noted, however, that the one-way clutch F1 may be of a roller type or the like, other than the sprag type.

Figure 2:
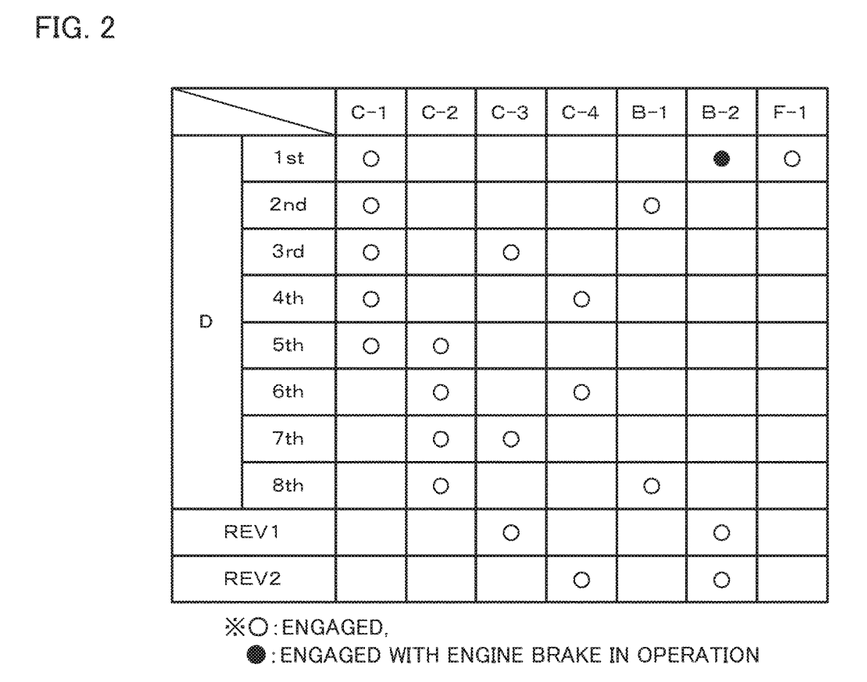
FIG. 2 is an operation table illustrating the relationship between each shift speed of an automatic transmission 25 included in the power transfer device 20 of FIG. 1 and the respective operating states of clutches and brakes.

The clutches C1 to C4 and the brakes B1 and B2 operate with working oil supplied thereto and discharged therefrom by the hydraulic control device (not illustrated). FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 formed on (or fixed to) the counter shaft 42; and a differential ring gear (final driven gear) 45 disposed below the drive pinion gear 44 (see FIG. 3) and meshed with the drive pinion gear 44. The differential ring gear 45 is constituted as a helical gear.

As illustrated in FIGS. 1 and 3 to 6, the differential gear 50 includes a pair of (two) pinion gears 51, a pair of (two) side gears 52 each fixed to the drive shaft 28 and meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, a pinion washer 55 is disposed between each of the pinion gears 51 and the differential case 54, and a side washer 56 is disposed between each of the side gears 52 and the differential case 54. The differential case 54 is rotatably supported by the transmission case 22 via bearings 81 and 82 coaxially with the drive shaft 28.

Figure 3:
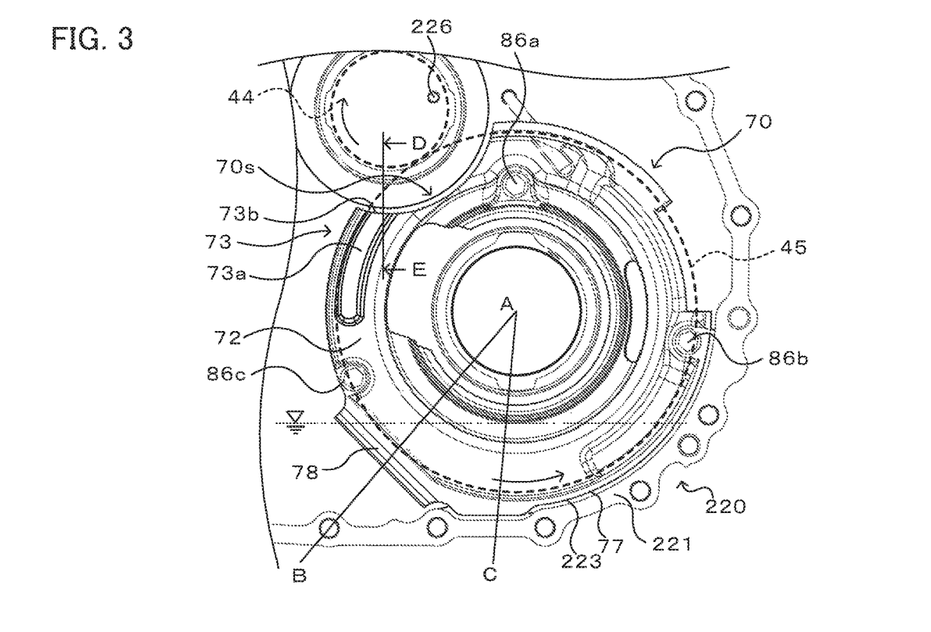
FIG. 3 is an explanatory diagram illustrating a state in which a reservoir plate 70 is attached to a converter housing 220.
Figure 4:
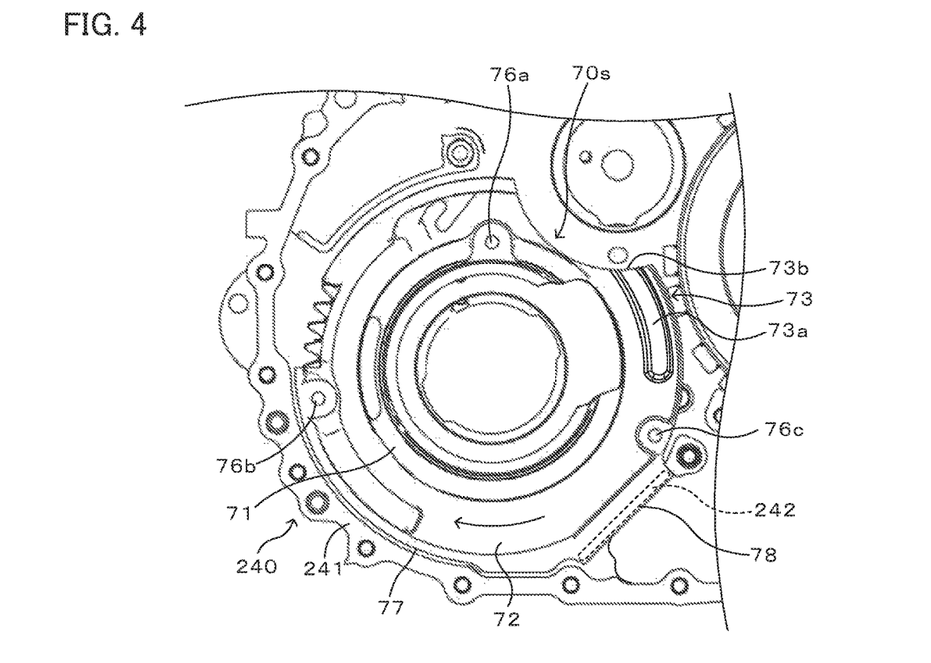
FIG. 4 is an explanatory diagram illustrating a state in which the reservoir plate 70 is disposed on a transaxle case 240.
Figure 5:
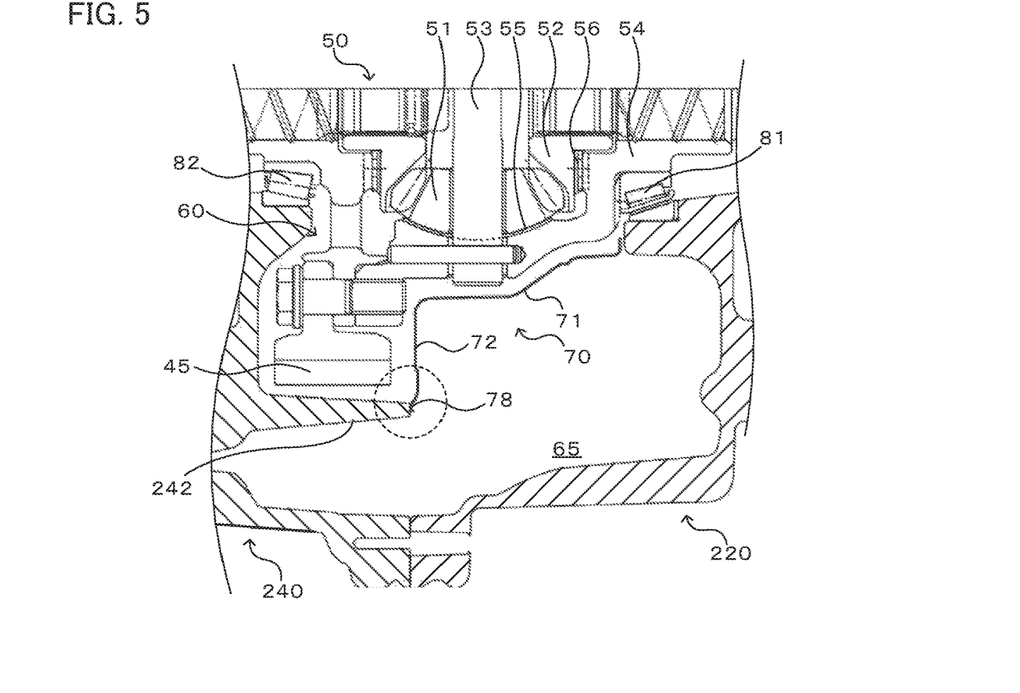
FIG. 5 is an explanatory diagram illustrating a sectional view taken along the line A-B in FIG. 3.
Figure 6:
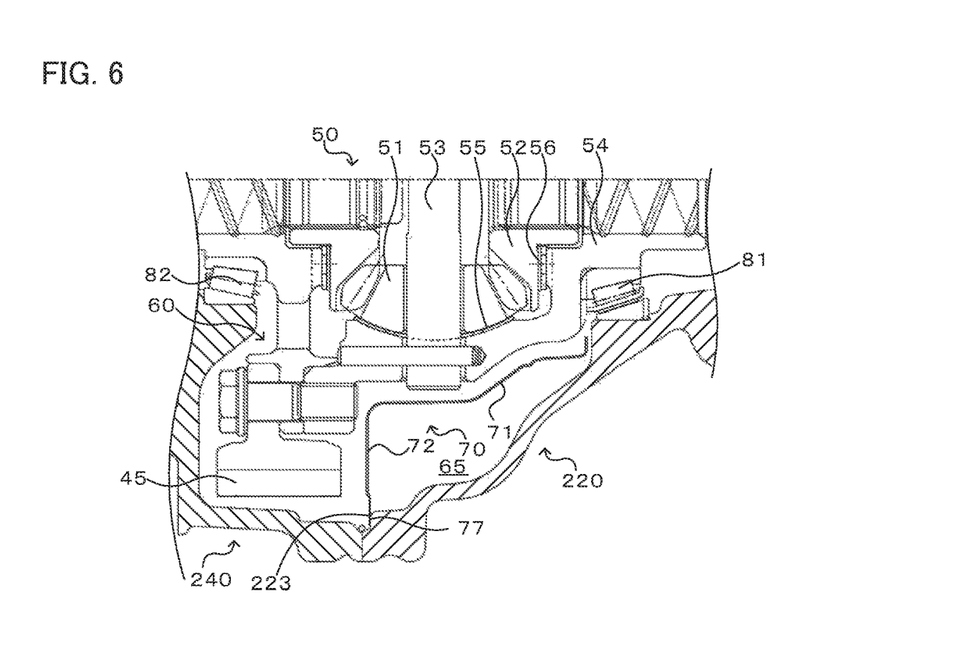
FIG. 6 is an explanatory diagram illustrating a sectional view taken along the line A-C in FIG. 3.
Figure 7:
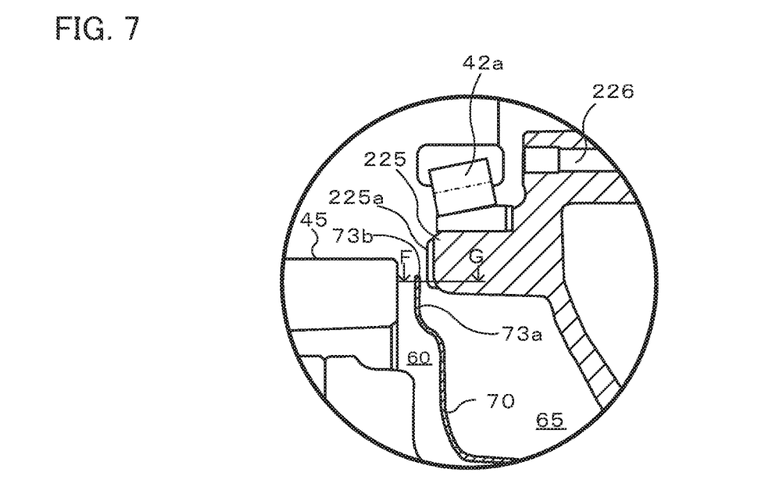
FIG. 7 is an explanatory diagram illustrating a sectional view taken along the line D-E in FIG. 3.

Subsequently, the structure around the differential ring gear 45 and the differential gear 50 in the power transfer device 20 will be described. FIG. 3 is an explanatory diagram illustrating a state in which the reservoir plate 70 is disposed on the converter housing 220. FIG. 4 is an explanatory diagram illustrating a state in which the reservoir plate 70 is attached to the transaxle case 240. FIG. 5 is an explanatory diagram illustrating a sectional view taken along the line A-B in FIG. 3. FIG. 6 is an explanatory diagram illustrating a sectional view taken along the line A-C in FIG. 3. FIG. 7 is an explanatory diagram illustrating a sectional view taken along the line D-E in FIG. 3. In FIG. 3, the upper left circle in the broken line indicates the drive pinion gear 44, and the center circle in the broken line indicates the differential ring gear 45. In FIG. 3, in addition, the dash-and-dot line indicates the liquid surface of working oil in a working oil storage chamber 65, and the arrows indicate the rotational directions of the drive pinion gear 44 and the differential ring gear 45.

Figure 8:
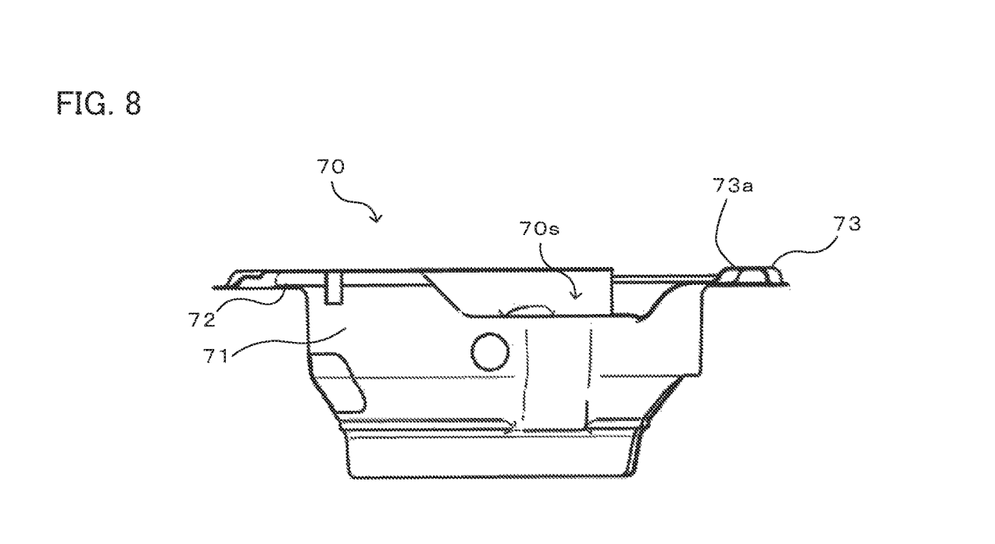
FIG. 8 is a view showing the outer appearance of the reservoir plate 70.
Figure 9:
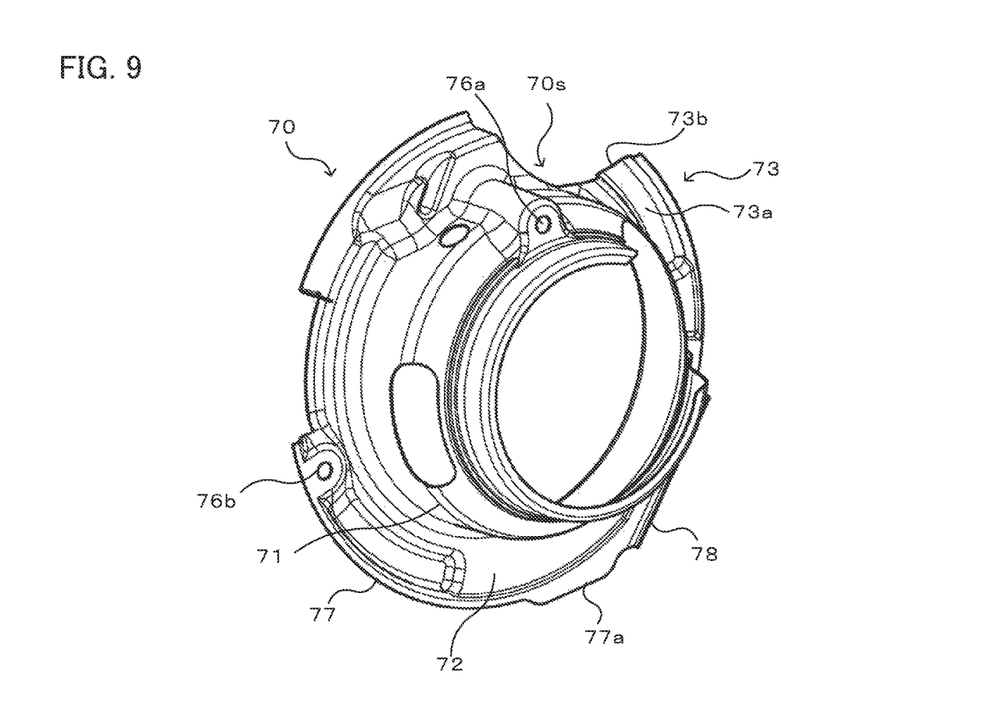
FIG. 9 is a view showing the outer appearance of the reservoir plate 70.
Figure 10:
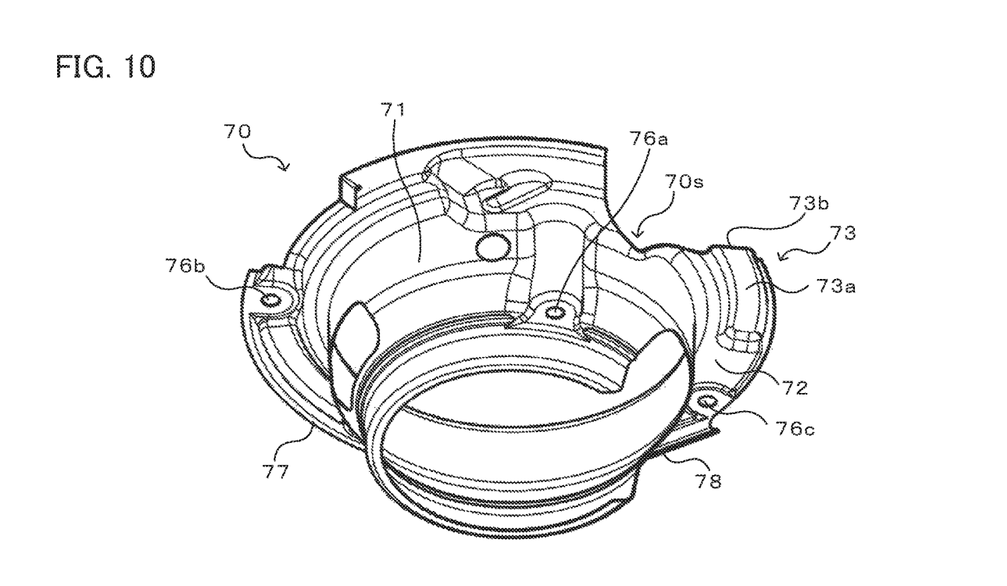
FIG. 10 is a view showing the outer appearance of the reservoir plate 70.

As illustrated in the drawings, a space inside the transmission case 22 which includes the converter housing 220 and the transaxle case 240 is partitioned by the reservoir plate 70 illustrated in FIGS. 8 to 10 into a differential chamber 60, in which the differential ring gear 45 and the differential gear 50 are disposed, and the working oil storage chamber 65, in which working oil is stored. In the following description, the terms "upper" and "lower" indicate the "upper" and "lower" sides, respectively, in the vertical direction with the power transfer device 20 mounted on the vehicle.

Figure 11:
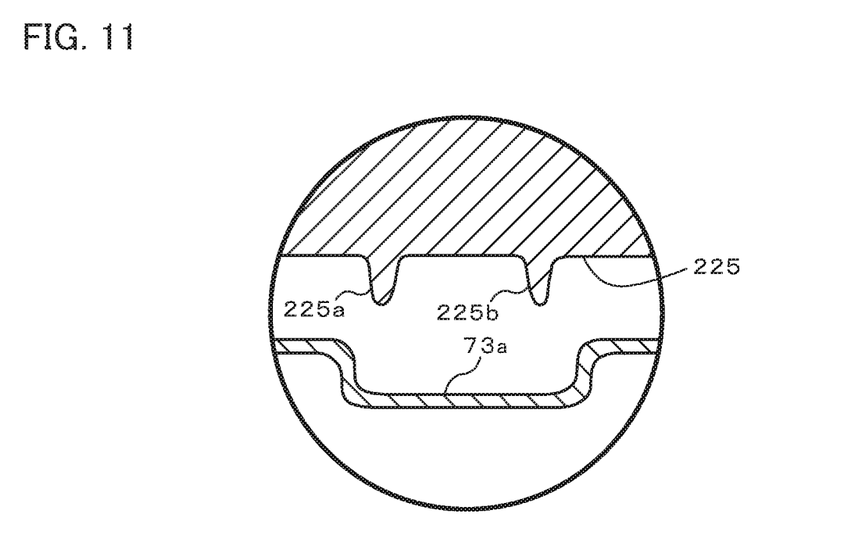
FIG. 11 is an explanatory diagram illustrating a sectional view taken along the line F-G in FIG. 7.

As illustrated in FIG. 3, the converter housing 220 has a housing-side mating surface (first case mating surface) 221 for assembly to the transaxle case 240. A housing-side stepped surface 223 that is stepped inward by about the thickness of the reservoir plate 70 is formed along the housing-side mating surface 221 in the range from the vicinity of the bottom portion of the housing-side mating surface 221 to a location above and to the right in the drawing by approximately 90 degrees along the outer edge of the reservoir plate 70. As illustrated in FIG. 7, the converter housing 220 is provided with: a bearing support portion 225 that rotatably supports a bearing 42a used in a bearing (not illustrated) that rotatably supports the counter shaft 42 on which the drive pinion gear 44 is formed (or fixed); and a working oil supply hole 226 through which working oil is supplied to the bearing 42a. The bearing support portion 225 is provided with ribs 225a and 225b (see FIG. 11) that function as drainpipes that lead working oil flowing down from the bearing 42a downward. FIG. 11 is a sectional view taken along the line F-G in FIG. 7.

As illustrated in FIG. 4, the transaxle case 240 has a case-side mating surface (second case mating surface) 241 for assembly to the converter housing 220. The transaxle case 240 is provided with a rib 242 (see FIGS. 4 and 5) that extends linearly and rightward in the drawing from the vicinity of the bottom portion toward the center at an angle of approximately 45 degrees.

As illustrated in FIGS. 8 to 10, the reservoir plate 70 includes a tubular portion 71 and a flange portion 72 that extends radially outward from the tubular portion 71. As illustrated in FIG. 3, the reservoir plate 70 is attached and fixed to the converter housing 220 by three bolts 86a to 86c using a bolt hole 76a formed in the tubular portion 71 and two bolt holes 76b and 76c formed in the flange portion 72. The reservoir plate 70 which is constituted from the tubular portion 71 and the flange portion 72 is formed by pressing a metal material such as iron. The reservoir plate 70 may be molded from a resin by injection molding.

As illustrated in FIGS. 5 and 6, the tubular portion 71 is formed to extend along a part of the outer peripheral surface of the differential case 54 of the differential gear 50, and mainly surrounds a portion of the differential case 54 excluding a side gear support portion (a portion supported by the converter housing 220 via the bearing 81) on one side of the differential case 54. A slight clearance is defined between an end portion of the tubular portion 71 on the converter housing 220 side and the converter housing 220 with the reservoir plate 70 fixed to the transmission case 22.

The flange portion 72 extends radially outward from an end portion of the tubular portion 71 on the transaxle case 240 side. In addition, a notched portion 70s is formed above the flange portion 72 and the tubular portion 71 so as not to interfere with a bearing (not illustrated) that rotatably supports the counter shaft 42. Consequently, the flange portion 72 extends in an arc shape (in a generally C-shape) around the tubular portion 71. As illustrated in FIG. 3, a first seal portion 77 is formed at the outer edge portion of the flange portion 72 from the bottom portion to a location above and to the right in the drawing by approximately 90 degrees, including the bottom portion. The first seal portion 77 abuts against the housing-side stepped surface 223 of the converter housing 220 to secure seal of the first seal portion 77. In addition, a second seal portion 78 is formed at the outer edge portion of the flange portion 72 from the first seal portion 77 to a location above and to the left in the drawing by approximately 60 degrees. As illustrated in FIGS. 3, 4, and 8 to 10, the outer edge of the second seal portion 78 is formed linearly, and the second seal portion 78 is formed so as to project toward the rib 242 of the transaxle case 240 such that the outer edge of the second seal portion 78 easily abuts against the rib 242. Therefore, the second seal portion 78 is pressed by the rib 242 to be elastically deformed, which secures seal of the second seal portion 78 better.

The flange portion 72 is provided with an extending curved portion 73 that extends so as to receive the lower side of the bearing (see FIG. 7) 42a which is used in the bearing which supports the counter shaft 42 to constitute a part of the notched portion 70s. In the extending curved portion 73, as illustrated in FIGS. 8 to 10, a groove-like curved portion 73a that is curved toward the differential chamber 60 is formed to extend to an upper end portion 73b. As illustrated in FIG. 7, the upper end portion 73b of the extending curved portion 73 is formed to swell toward the differential chamber 60 with respect to the bearing support portion 225 which is formed on the converter housing 220 so as to rotatably support the bearing 42a. Therefore, working oil supplied from the working oil supply hole 226 to flow down from the center of rotation of the bearing 42a is led toward the working oil storage chamber 65 by the upper end portion 73b of the extending curved portion 73. In this event, the ribs 225a and 225b of the bearing support portion 225 function as drainpipes that lead working oil to the upper end portion 73b of the extending curved portion 73.

Figure 12:
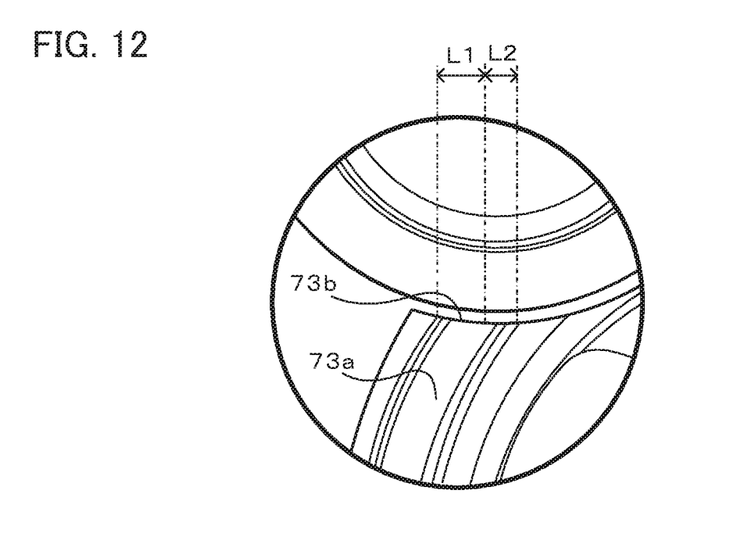
FIG. 12 is an explanatory diagram illustrating the vicinity of an upper end portion 73b of an extending curved portion 73 of FIG. 3 as enlarged.

FIG. 12 is an explanatory diagram illustrating the extending curved portion 73 in FIG. 3 as enlarged. In the drawing, the dash-and-dot line at the middle, of the three dash-and-dot lines, indicates a vertical line that extends from the center of the bearing 42a, and the dash-and-dot lines on both sides indicate a range in which the upper end portion 73b is curved. As illustrated in the drawing, the upper end portion 73b of the extending curved portion 73 is formed such that a range L1 of the curved portion in the rotational direction of the drive pinion gear 44 (in the leftward direction in the drawing) with respect to the vertical line which extends from the center of the bearing 42a is larger than a range L2 of the curved portion on the opposite side (in the rightward direction in the drawing) of the vertical line which extends from the center of the bearing 42a. Working oil flowing down from the bearing 42a has been provided with a motion component in the rotational direction of the counter shaft 42 and the drive pinion gear 44, and therefore flows down in the rotational direction with respect to the vertical line which extends from the center of the bearing 42a. The upper end portion 73b of the extending curved portion 73 according to the embodiment is formed such that the range L1 of the curved portion is larger than the range L2 of the curved portion as discussed above in order to lead working oil flowing down in the rotational direction with respect to the vertical line which extends from the center of the bearing 42a toward the working oil storage chamber 65. Consequently, a larger amount of working oil can be led to the working oil storage chamber 65.

In the power transfer device 20 according to the embodiment described above, the extending curved portion 73 is provided below the bearing 42a which is used in the bearing which supports the counter shaft 42 of the reservoir plate 70 to extend so as to receive the bearing 42a, and to swell toward the differential chamber 60 with respect to the bearing support portion 225 which supports the bearing 42a, which allows working oil flowing down from the center of rotation of the bearing 42a to be led to the working oil storage chamber 65. Moreover, the bearing support portion 225 of the converter housing 220 is provided with the ribs 225a and 225b which function as drainpipes, which allows a larger amount of working oil to be led to the working oil storage chamber 65. Further, the upper end portion 73b of the extending curved portion 73 is formed such that the range L1 of the curved portion in the rotational direction of the drive pinion gear 44 with respect to the vertical line which extends from the center of the bearing 42a is larger than the range L2 of the curved portion on the opposite side, which allows a larger amount of working oil having a motion component in the direction of rotation of the counter shaft 42 and the drive pinion gear 44 to be led to the working oil storage chamber 65 by rotation of the counter shaft 42 and the drive pinion gear 44. As a result, it is possible to suppress an inflow of working oil into the differential chamber 60, and suppress an increase in stirring resistance of working oil which acts on the differential ring gear 45 due to a residence of working oil in the differential chamber 60.

In the power transfer device 20 according to the embodiment, originally, the first seal portion 77 is formed at the outer edge portion including the bottom portion of the flange portion 72 of the reservoir plate 70, and abuts against the housing-side stepped surface 223 of the converter housing 220 to secure seal of the first seal portion 77, and the second seal portion 78 is formed to extend from the bottom portion of the flange portion 72 toward the side opposite to the first seal portion 77, and abuts and is pressed against the rib 242 of the transaxle case 240 to secure seal of the second seal portion 78. The second seal portion 78 is formed linearly, and thus the state of contact with the rib 242 can be maintained, even if the second seal portion 78 is pressed and deformed by the rib 242, compared to a seal portion with an arc-shaped or curved outer edge, which makes it possible to secure seal better. As a result, it is possible to better suppress an inflow of working oil from the working oil storage chamber 65 into the differential chamber 60, and to further reduce the stirring resistance of working oil which acts on the differential ring gear 45.

In the power transfer device 20 according to the embodiment, the bearing support portion 225 of the converter housing 220 is provided with the ribs 225a and 225b which function as drainpipes. However, grooves may be provided in place of the ribs. Alternatively, such ribs or grooves may not be provided.

In the power transfer device 20 according to the embodiment, the upper end portion 73b of the extending curved portion 73 is formed such that the range L1 of the curved portion in the rotational direction of the drive pinion gear 44 with respect to the vertical line which extends from the center of the bearing 42a is larger than the range L2 of the curved portion on the opposite side. However, the upper end portion 73b may be formed such that the range L1 of the curved portion in the rotational direction of the drive pinion gear 44 may be equal to the range L2 of the curved portion on the opposite side.

While a mode for carrying out the present disclosure has been described above by way of an embodiment, it is a matter of course that the present disclosure is not limited to the embodiment in any way, and that the present disclosure may be implemented in various forms without departing from the scope of the present disclosure.

In the power transfer device according to the present disclosure, the extending curved portion may be formed such that a curved portion of the extending curved portion extends over a range that includes a vertical line that extends from a rotational axis of the bearing. Consequently, a larger amount of working oil can be led to the extending curved portion to flow into the working oil storage chamber. In this case, the extending curved portion may be formed such that a first range of the curved portion on a side in a rotational direction of the drive pinion gear during forward travel with respect to the vertical line which extends vertically from the rotational axis of the bearing is larger than a second range of the curved portion on the opposite side of the vertical line from the first range. This allows a larger amount of working oil having a motion component in the rotational direction of the drive pinion gear to be led to the extending curved portion to flow into the working oil storage chamber.

In the power transfer device according to the present disclosure, the partitioning member may have a tubular portion that is tubular and a flange portion that extends radially outward from an end surface of the tubular portion; and the extending curved portion may be formed to extend from the flange portion along a side surface of the differential ring gear.

In the power transfer device according to the present disclosure, the extending curved portion may be formed in an arc shape along an outer peripheral edge of the differential ring gear as seen in an axial direction of a rotational axis of the differential ring gear. In addition, the extending curved portion may be formed so as to overlap the bearing support portion as seen in an axial direction of a rotational axis of the differential ring gear.

In the power transfer device according to the present disclosure, the first case member may be provided with a first case mating surface and a first stepped surface formed in the vicinity of the bottom portion of the first case mating surface and stepped inward from the first case mating surface; the second case member may be provided with a second case mating surface aligned with the first case mating surface and a rib that extends from the vicinity of the bottom portion of the second case mating surface toward the center along the outer edge of the partitioning member; and the partitioning member may be provided with a first seal portion formed in a first bottom portion range of the outer peripheral portion that extends in one direction from the bottom portion, including the bottom portion, to abut against and seal the first stepped surface, and a second seal portion formed in a second bottom portion range of the outer peripheral portion that extends in the other direction from the vicinity of an end portion of the first bottom portion range on the bottom portion side to extend in the radial direction and abut against the rib. This allows the first seal portion of the partitioning member to abut against the first stepped surface to secure seal of the first seal portion, and allows the second seal portion to abut against the rib of the second case member to secure seal of the second seal portion. Consequently, it is possible to better suppress an inflow of working oil into the differential chamber in which the differential ring gear and the differential gear are disposed, and to further reduce the stirring resistance of working oil which acts on the differential ring gear.

INDUSTRIAL APPLICABILITY

The present disclosure is applicable, for example, to the power transfer device manufacturing industry etc.

The invention claimed is:

1. A power transfer device comprising: a differential ring gear disposed below a drive pinion gear on the input side and meshed with the drive pinion gear; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein:
   the partitioning member forms the working oil storage chamber together with a first case member of the case, and forms the differential chamber together with a second case member of the case;
   the first case member has a bearing support portion that supports a bearing that rotatably supports a rotary shaft of the drive pinion gear, and a working oil supply hole through which working oil is supplied to the bearing; and
   the partitioning member has an extending curved portion positioned below the bearing on the differential ring gear side with respect to the bearing and curved to swell toward the differential chamber with respect to the bearing support portion in order to lead working oil flowing down from the bearing to the working oil storage chamber.

2. The power transfer device according to claim 1, wherein
   the extending curved portion is formed such that a curved portion of the extending curved portion extends over a range that includes a vertical line that extends from a rotational axis of the bearing.

3. The power transfer device according to claim 2, wherein
   the extending curved portion is formed such that a first range of the curved portion on a side in a rotational direction of the drive pinion gear during forward travel with respect to the vertical line which extends vertically from the rotational axis of the bearing is larger than a second range of the curved portion on the opposite side of the vertical line from the first range.

4. The power transfer device according to claim 3, wherein:
   the partitioning member has a tubular portion that is tubular and a flange portion that extends radially outward from an end surface of the tubular portion; and
   the extending curved portion is formed to extend from the flange portion along a side surface of the differential ring gear.

5. The power transfer device according to claim 4, wherein
   the extending curved portion is formed in an arc shape along an outer peripheral edge of the differential ring gear as seen in an axial direction of a rotational axis of the differential ring gear.

6. The power transfer device according to claim 5, wherein the extending curved portion is formed so as to overlap the bearing support portion as seen in an axial direction of a rotational axis of the differential ring gear.

7. The power transfer device according to claim 1, wherein:
the partitioning member has a tubular portion that is tubular and a flange portion that extends radially outward from an end surface of the tubular portion; and
the extending curved portion is formed to extend from the flange portion along a side surface of the differential ring gear.

8. The power transfer device according to claim 7, wherein
the extending curved portion is formed in an arc shape along an outer peripheral edge of the differential ring gear as seen in an axial direction of a rotational axis of the differential ring gear.

9. The power transfer device according to claim 8, wherein
the extending curved portion is formed so as to overlap the bearing support portion as seen in an axial direction of a rotational axis of the differential ring gear.

10. The power transfer device according to claim 1, wherein
the extending curved portion is formed in an arc shape along an outer peripheral edge of the differential ring gear as seen in an axial direction of a rotational axis of the differential ring gear.

11. The power transfer device according to claim 10, wherein
the extending curved portion is formed so as to overlap the bearing support portion as seen in an axial direction of a rotational axis of the differential ring gear.

12. The power transfer device according to claim 2, wherein:
the partitioning member has a tubular portion that is tubular and a flange portion that extends radially outward from an end surface of the tubular portion; and
the extending curved portion is formed to extend from the flange portion along a side surface of the differential ring gear.

13. The power transfer device according to claim 12, wherein
the extending curved portion is formed in an arc shape along an outer peripheral edge of the differential ring gear as seen in an axial direction of a rotational axis of the differential ring gear.

14. The power transfer device according to claim 13, wherein
the extending curved portion is formed so as to overlap the bearing support portion as seen in an axial direction of a rotational axis of the differential ring gear.

15. The power transfer device according to claim 2, wherein
the extending curved portion is formed in an arc shape along an outer peripheral edge of the differential ring gear as seen in an axial direction of a rotational axis of the differential ring gear.

16. The power transfer device according to claim 15, wherein
the extending curved portion is formed so as to overlap the bearing support portion as seen in an axial direction of a rotational axis of the differential ring gear.

17. The power transfer device according to claim 3, wherein
the extending curved portion is formed in an arc shape along an outer peripheral edge of the differential ring gear as seen in an axial direction of a rotational axis of the differential ring gear.

18. The power transfer device according to claim 17, wherein
the extending curved portion is formed so as to overlap the bearing support portion as seen in an axial direction of a rotational axis of the differential ring gear.

* * * * *